(12) United States Patent
Meckstroth et al.

(10) Patent No.: US 6,640,563 B2
(45) Date of Patent: Nov. 4, 2003

(54) MOMENTARY ENGAGEMENT AND DISENGAGEMENT OF AUTOMOTIVE AIR CONDITIONER CLUTCH

(75) Inventors: Richard J. Meckstroth, Vonore, TN (US); Daniel G. Engler, Oxford, MI (US)

(73) Assignee: Dayco Products, LLC, Miamisburg, OH (US)

( * ) Notice: Subject to any disclaimer, the term of this patent is extended or adjusted under 35 U.S.C. 154(b) by 25 days.

(21) Appl. No.: 10/044,180

(22) Filed: Jan. 10, 2002

(65) Prior Publication Data

US 2003/0126870 A1 Jul. 10, 2003

(51) Int. Cl.$^7$ .................................................. B60H 1/32
(52) U.S. Cl. ......................... 62/133; 62/323.4; 192/25; 192/84.31
(58) Field of Search ............................ 62/133, 323.4; 192/3.58, 22, 25, 84.31

(56) References Cited

U.S. PATENT DOCUMENTS

| | | | | |
|---|---|---|---|---|
| 3,642,104 A | * | 2/1972 | Schäfer | 192/84.31 X |
| 5,847,478 A | * | 12/1998 | Usui et al. | 192/84.31 X |
| 6,095,693 A | | 8/2000 | Fujiwara | |
| 6,110,061 A | | 8/2000 | Kishibuchi et al. | |
| 6,138,804 A | | 10/2000 | Tazumi et al. | |
| 6,145,754 A | | 11/2000 | Uemura et al. | |
| 6,161,671 A | | 12/2000 | Sakamoto et al. | |
| 6,213,882 B1 | | 4/2001 | Okada et al. | |
| 6,233,957 B1 | | 5/2001 | Hirao et al. | |

FOREIGN PATENT DOCUMENTS

JP 62-137220 * 6/1987 ................. 62/323.4

* cited by examiner

Primary Examiner—Harry B. Tanner
(74) Attorney, Agent, or Firm—Joseph V. Tassone; J. Daniel Lykins

(57) ABSTRACT

An electrically actuated clutch assembly for a compressor in an automotive air conditioner is described wherein clutch engagement to and disengagement with the compressor are momentary events with no electrical current being required to maintain the on and off states of the clutch.

9 Claims, 2 Drawing Sheets

MOMENTARY ENGAGEMENT AND DISENGAGEMENT OF AUTOMOTIVE AIR CONDITIONER CLUTCH

BACKGROUND OF THE INVENTION

The present invention relates to air conditioners, and more particularly to an automotive air conditioner compressor clutch and method wherein the engagement and disengagement of the air conditioner clutch are momentary events with no current being required to maintain the on and off state of the clutch.

The use of air conditioners in vehicles has become so widespread that almost all vehicles, and particularly full size and luxury automobiles, are now manufactured with an air conditioner as standard equipment. In many vehicles the air conditioner is automatically controlled to keep the cabin at a constant temperature. In some instances, the temperature can even be controlled to provide different areas of the vehicle cabin with different temperatures.

Typically, the air conditioner unit cools air entering the air conditioning unit from outside the vehicle or from inside the vehicle and then introduces the cooled air into the vehicle cabin through the various air ducts generally located on the dash board of the vehicle.

The air conditioner is composed mainly of an air conditioner drive source, a compressor, a condenser, an expansion valve, and an evaporator unit. The refrigerant circulating circuit is formed by connecting each component with refrigerant piping. For example, the compressor is connected to the engine as a drive source via a compressor clutch. The compressor compresses a low temperature and low pressure gas refrigerant gasified by the evaporator, and supplies the gas to the condenser as a high temperature and high pressure gas refrigerant. The condenser cools and condenses the high temperature and high pressure gas refrigerant. The refrigerant liquefied by the condenser is separated into gas and liquid and then sent to the expansion valve as a high temperature and high pressure liquid. The expansion valve decompresses and expands the high temperature and high pressure liquid to give a low temperature and low pressure liquid refrigerant which is then sent to the evaporator to complete the refrigerating cycle.

Since the air conditioner compressor in a conventional vehicle air conditioner is driven using the engine as the drive source, the capacity of the air conditioner varies depending upon the particular vehicle engine and RPM generated by the engine. Given that the cooling capacity of the refrigerant cycle increases substantially linearly in proportion to the RPM of the engine, the cooling capacity in many cases may exceed the demand on the air conditioner side. Therefore, with a conventional vehicular air conditioner, the cooling capacity is adjusted by engaging and disengaging the compressor clutch.

Current air conditioners are belt driven and when engaged, current is applied to a stationary electromagnetic coil attached to the compressor. While the clutch is engaged, the coil typically uses from about 3 to 5 amperes which, for a 12.5 volt system, amount to about 38 to 63 watts of energy steadily being consumed, causing a needless waste of energy. Therefore, it is an object of this invention to provide a momentary engaging and disengaging vehicle air conditioner clutch which drastically conserves energy and improves fuel economy.

SUMMARY OF THE INVENTION

The electrically actuated air conditioner clutch of the invention includes a clutch hub plate, latching solenoids, locking solenoids, an intermediate latch plate assembly, a latch plate spring, a belt driven pulley, a stationary coil, a pulley bearing, a latch plate bearing and a latch plate spring bearing. Generally, the air conditioner clutch of the invention is only slightly larger than conventional air conditioner clutches and it can use come of the same technology as a conventional clutch.

In accordance with the present invention, almost all of the electrical energy consumed in operating a vehicular air conditioner can be conserved with dramatic improvement in fuel economy, by momentary engagement and disengagement of the air conditioner clutch, with no current being required to maintain the on or off status of the clutch.

Assuming that the air conditioner clutch is on 30% of the time a car is driving, that the average vehicle mileage is 15,000 miles per year, that the average speed is 40 mph, that the average clutch current is 4 amperes, that there are 60 million cars with air conditioners operational in this country, then a total of 338,000 megawatt hours of electricity could be conserved annually. Since engine-driven alternators are only about 60–70% efficient, and that the engines themselves are only 20–40% efficient, a significant amount of gasoline could be saved with this device.

DETAILED DESCRIPTION OF THE INVENTION

Figure 1:
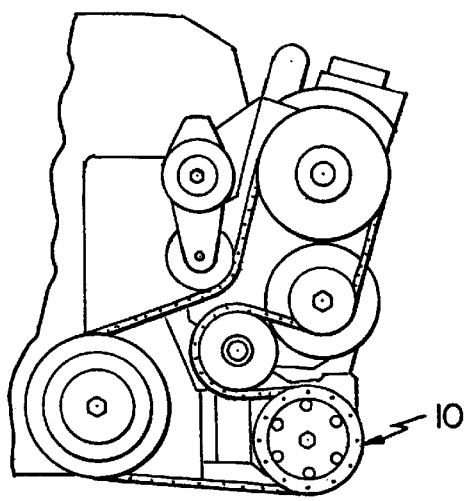
FIG. 1 is a cross-sectional view showing an automotive air conditioner in accordance with the present invention.
Figure 2:
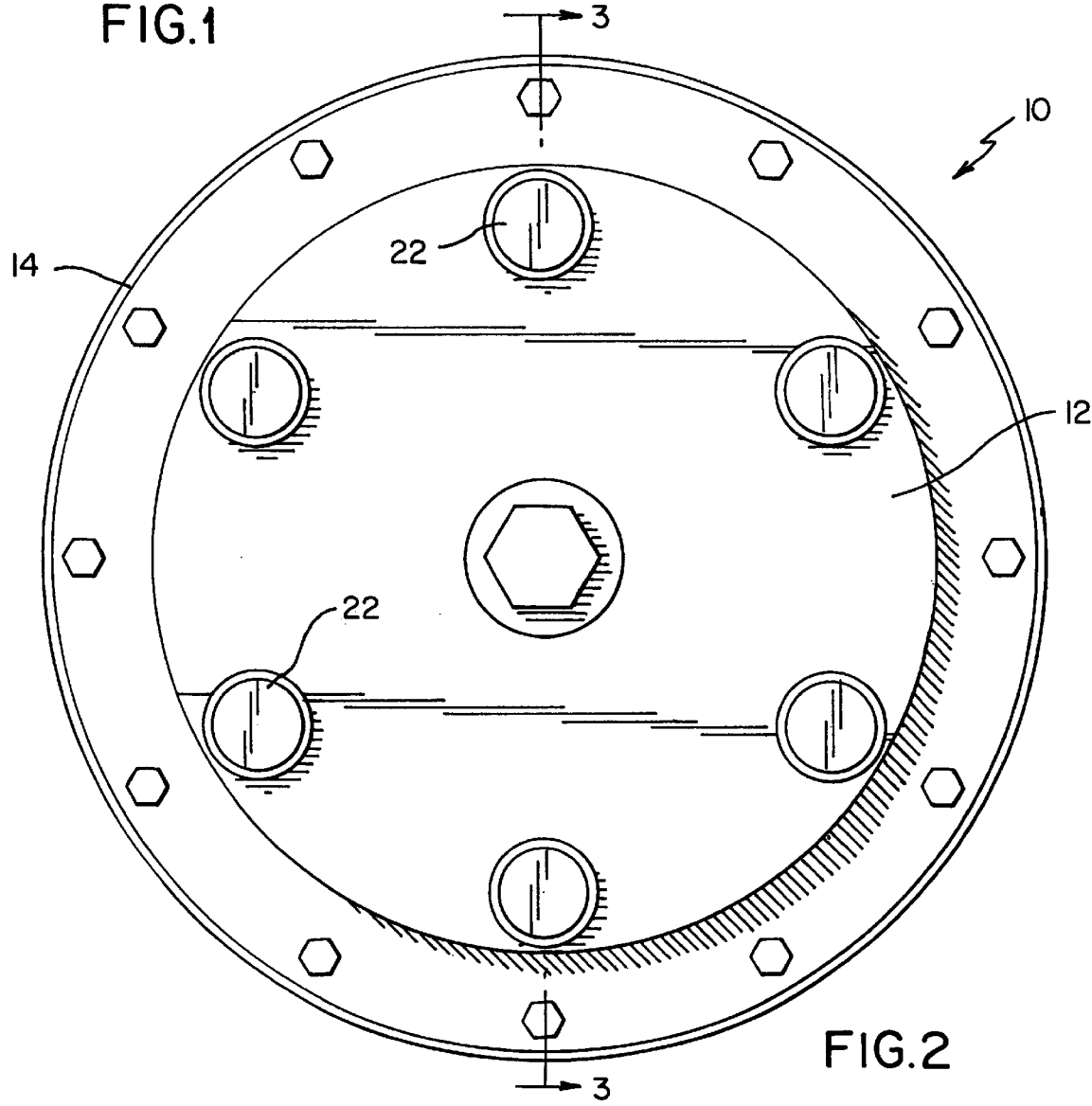
FIG. 2 is a front view of the front hub plate of the automotive air conditioner clutch in accordance with the present invention.
Figure 3:
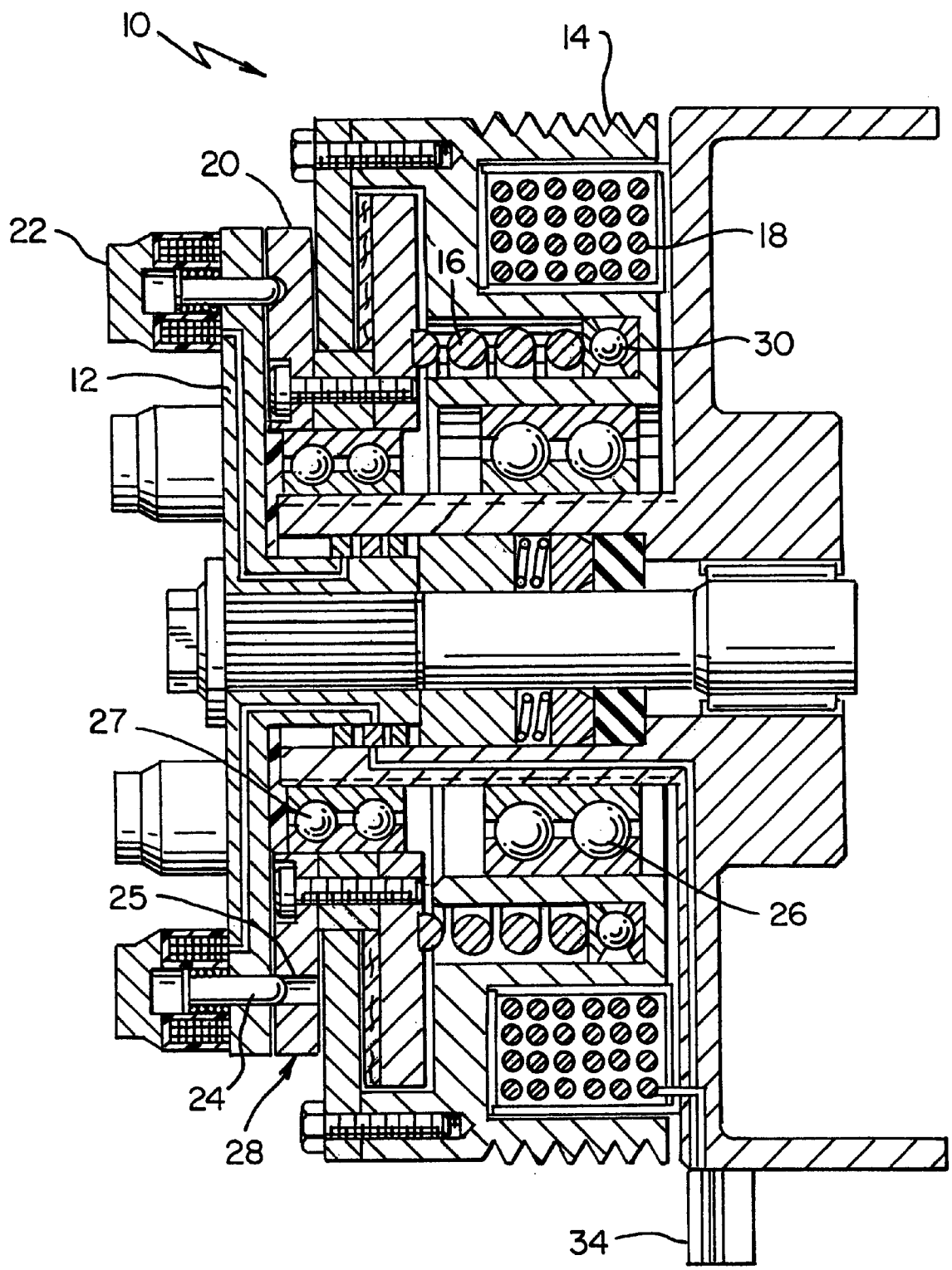
FIG. 3 is a cross-sectional view showing an air conditioner clutch assembly in accordance with the present invention.

As illustrated in the FIG. 3, the electrically actuated air conditioner clutch assembly 10 of the invention includes the following elements: an air conditioner compressor hub plate 12, a belt driven pulley 14, a latch plate spring 16, a stationary coil 18, latch plate 20, synchronized latch plate solenoids 22, locking solenoid pins 24, pulley bearings 26, latch plate bearings 28 and latch spring bearings 30.

The air conditioner clutch assembly 10 of the invention is engaged by attracting the intermediate latch plate assembly 28, which disengages the air conditioner compressor hub plate 12 from the belt driven pulley 14. Normally, the latch plate assembly 28 is held in contact with the pulley 14 by a latch plate spring 16; however, when the stationary means 18 is activated, the latch plate assembly 28 disconnects from the pulley 14. With the latch plate assembly 28 disconnected from the pulley 14, there is no longer any torque applied to the latch plate assembly 28 and, therefore, it becomes free to rotate. At this point the synchronizing solenoids 22 are activated aligning the locking solenoid pins 24 located on the hub plate 12, to the holes 26 on the latch plate assembly 28. Within milliseconds, the locking solenoid pins 24 are activated and the hub plate 12 is locked to the latch plate assembly 28. Once this occurs, electrical current from the coil 18 ceases and the latch plate spring 16 re-engages the latch plate assembly 28 to the pulley 14 via air conditioner compressor hub plate 12. With the current from the coil 18 to the latch plate assembly 28 terminated, the torque of engagement holds the solenoid pins 24 in place. At this point, the air conditioner clutch is engaged, but no current is being applied to the assembly. The electric current to the stationary coil 20 is provided by an automotive ignition switch (not shown) via electrical connector 34. Power to the ignition switch is provided by a battery/alternator system (now shown). Typically, the current to the clutch is controlled by a dual pressure switch in the vacuum side of the refrigerant system, which engages the clutch at approximately 40 psig and disengages it at approximately 20 psig. In the present invention, this switch function is replaced by an electrical controller that creates controlled short time voltage events at a low and high pressure. Such devices are known in the art and are used in common voltage counters.

To disengage the air conditioner clutch, the stationary coil 18 is again activated compressing the latch plate spring 16 which eliminates the torque drive from the pulley 14 through the latch plate assembly 28 allowing the latch plate assembly 28 to ride with the compressor hub 12. Under this condition of no torque, the synchronizing solenoids 22 pull the locking solenoid pins 24 out of the holes 26 in the latch plate assembly 28, thereby disengaging the air conditioner compressor hub 12 from the latch plate assembly 28. Within milliseconds, the stationary coil 18 is deactivated allowing the latch spring 16 to re-engage the latch plate assembly 28 to the belt driven pulley 14. At this point, the compressor is fully disengaged, but no current is being applied to the assembly.

Although the present invention has been fully described in connection with a preferred embodiment thereof and with reference to the accompanying drawing, various changes and modifications will occur to those skilled in the art. Accordingly, such changes and modifications are to be understood as being within the scope of the present invention as defined by the appended claims.

What is claimed is:

1. An electrically actuated clutch assembly for a compressor in an automotive air conditioner wherein clutch engagement to and disengagement from the compressor are momentary events with no current being required to maintain the on and off states of said clutch, wherein said electrically actuated clutch assembly comprises:
   a belt driven pulley operatively connected to a shaft of an automotive engine;
   a compressor hub plate operatively connected to said belt driven pulley;
   an intermediate latch plate assembly operatively connected to said belt driven pulley;
   a latch plate spring operatively connected to said latch plate assembly;
   locking solenoid pins operatively connected to said synchronizing solenoids; and
   a stationary coil operatively connected to the compressor, wherein momentary activation of said stationary coil causes said clutch engagement to and disengagement from the compressor.

2. The electrically actuated clutch assembly of claim 1 wherein said stationary coil is activated by an automotive ignition switch.

3. The electrically actuated clutch assembly of claim 2 wherein said automotive ignition switch is powered by a battery.

4. The electrically actuated clutch assembly of claim 3 wherein said battery is a 12 volt battery.

5. An electrically actuated clutch assembly for a compressor in an automotive air conditioner wherein clutch engagement and disengagement with the compressor are momentary events with no current being required to maintain the on or off state of the clutch, said clutch assembly comprising:
   a belt driven pulley operatively connected to a shaft of an automotive engine;
   a compressor hub plate operatively connected to said belt driven pulley;
   an intermediate latch plate assembly operatively connected to said belt driven pulley;
   a latch plate spring operatively connected to said intermediate latch plate assembly;
   synchronizing solenoids operatively connected to said latch plate assembly;
   locking solenoid pins operatively connected to said synchronizing solenoids; and
   a stationary electric coil operatively connected to the compressor, wherein said stationary electric coil is momentarily activated by an automotive ignition switch powered by a 12 volt battery/alternator system causing said clutch engagement and disengagement with said compressor.

6. In an air conditioner system for use in an automotive vehicle to cool air in a vehicle interior, said air conditioner system including an air conditioner drive source, a compressor, a compressor clutch, a condenser, an expansion valve, an evaporator unit and piping, connecting each component, through which refrigerant circulates, the improvement which comprises activating said compressor clutch such that clutch engagement and disengagement with said compressor are momentary events with no electrical current being required to maintain the on and off states of said clutch, wherein said electrically actuated clutch assembly comprises:
   a belt driven pulley operatively connected to a shaft of an automotive engine;
   a compressor hub plate operatively connected to said belt driven pulley;
   an intermediate latch plate assembly operatively connected to said belt driven pulley;
   a latch plate spring operatively connected to said intermediate latch plate assembly;
   synchronizing solenoids operatively connected to said latch plate assembly;
   locking solenoid pins operatively connected to said synchronizing solenoids; and
   a stationary coil operatively connected to the compressor, wherein momentary activation of said stationary coil causes said clutch engagement and disengagement with the compressor.

7. The electrically actuated clutch assembly of claim 6 wherein said stationary electric coil is activated by an automotive ignition switch.

8. The electrically actuated clutch assembly of claim 7 wherein said automotive ignition is powered by a battery.

9. The electrically actuated clutch assembly of claim 8 wherein said battery is a 12 volt battery.

* * * * *